(12) United States Patent
Winkler

(10) Patent No.: US 7,727,307 B2
(45) Date of Patent: Jun. 1, 2010

(54) METHOD FOR REMOVING MERCURY FROM FLUE GAS AFTER COMBUSTION

(75) Inventor: Hermann Winkler, Recklinghausen (DE)

(73) Assignee: Evonik Energy Services GmbH, Essen (DE)

(*) Notice: Subject to any disclaimer, the term of this patent is extended or adjusted under 35 U.S.C. 154(b) by 193 days.

(21) Appl. No.: 12/082,761

(22) Filed: Apr. 14, 2008

(65) Prior Publication Data

US 2009/0056543 A1 Mar. 5, 2009

(30) Foreign Application Priority Data

Sep. 4, 2007 (EP) .................................. 07115662

(51) Int. Cl.
B01D 53/06 (2006.01)
B01D 53/64 (2006.01)

(52) U.S. Cl. ................ 95/92; 95/107; 95/134; 95/205; 95/235; 110/345

(58) Field of Classification Search ........ 95/92, 95/107, 134, 148, 205, 234, 235; 423/220, 423/210; 110/345
See application file for complete search history.

(56) References Cited

U.S. PATENT DOCUMENTS

| | | | |
|---|---|---|---|
| 4,615,991 A | 10/1986 | Obayashi et al. | 502/28 |
| 4,656,147 A | 4/1987 | Iida et al. | 502/26 |
| 5,151,256 A | 9/1992 | Kato et al. | 423/210 |
| 5,283,052 A | 2/1994 | Hums | 422/223 |
| 5,811,066 A | 9/1998 | Winkler et al. | 423/210 |
| 5,820,693 A | 10/1998 | Patchett et al. | 134/22.12 |
| 5,869,419 A | 2/1999 | Obayashi et al. | 502/305 |
| 5,873,329 A | 2/1999 | Heering et al. | 122/7 R |
| 5,882,422 A | 3/1999 | Obayashi et al. | 134/1 |
| 6,025,292 A | 2/2000 | Obayashi et al. | 502/27 |
| 6,090,355 A * | 7/2000 | Winkler et al. | 423/210 |
| 6,232,254 B1 | 5/2001 | Schneider et al. | 502/22 |
| 6,241,826 B1 | 6/2001 | Dittmer et al. | 134/1 |

(Continued)

FOREIGN PATENT DOCUMENTS

DE 38 10 137 A1 10/1989

(Continued)

OTHER PUBLICATIONS

Emissions Control, *SCR Maintenance Fundamentals*, Ken Wicker and Jim Staudt, Power, Jun. 2004, pp. 52-57.

*Primary Examiner*—Frank M Lawrence
(74) *Attorney, Agent, or Firm*—K&L Gates LLP

(57) ABSTRACT

A method of removing mercury from flue gases from combustion plants, such as for example power plants or waste incineration plants, is achieved in which mercury-containing flue gases are brought into contact with an adsorption reagent either directly or indirectly by being contained in an absorption reagent, whereby mercury is substantially adsorbed by the adsorption reagent during this contact. After adsorption has occurred the adsorption reagent is separated from the flue gases and subsequently from the absorption reagent and added to an aqueous solution containing an oxidizing agent, whereby the adsorbed mercury dissolves as $Hg^{2+}$. The $Hg^{2+}$-containing solution is subsequently separated from the adsorption agent and the $Hg^{2+}$ then is removed from the solution. This method enables the mercury to be removed from flue gas in a simple and economical manner.

11 Claims, 1 Drawing Sheet

U.S. PATENT DOCUMENTS

| | | |
|---|---|---|
| 6,387,836 B1 | 5/2002 | Dörr et al. ................... 502/22 |
| 6,395,665 B2 | 5/2002 | Nojima et al. ................ 502/25 |
| 6,455,456 B1 | 9/2002 | Spokoyny ..................... 502/20 |
| 6,482,762 B1 | 11/2002 | Ruffin et al. .................. 502/33 |
| 6,484,733 B2 | 11/2002 | Budin et al. ............. 134/22.19 |
| 6,596,661 B2 | 7/2003 | Neufert ....................... 502/22 |
| 6,631,727 B2 | 10/2003 | Schneider et al. ........... 134/110 |
| 6,913,026 B2 | 7/2005 | Winnestaffer et al. .... 134/22.18 |
| 6,929,701 B1 | 8/2005 | Patel et al. ..................... 134/1 |
| 6,953,494 B2* | 10/2005 | Nelson, Jr. ................... 95/134 |
| 2002/0006860 A1 | 1/2002 | Schneider et al. ............. 502/22 |
| 2004/0013589 A1* | 1/2004 | Vosteen et al. .............. 423/210 |
| 2004/0163676 A1 | 8/2004 | Winnestaffer et al. ......... 134/17 |
| 2005/0119109 A1 | 6/2005 | Schneider et al. ............. 502/22 |
| 2006/0060219 A1 | 3/2006 | Rabitsch et al. .......... 134/22.11 |
| 2006/0094587 A1 | 5/2006 | Lee et al. ...................... 502/27 |
| 2006/0135347 A1 | 6/2006 | Schluttig et al. .............. 502/25 |
| 2006/0148639 A1 | 7/2006 | Foerster ....................... 502/27 |
| 2007/0161509 A1* | 7/2007 | Bruggendick et al. ....... 502/353 |
| 2008/0202397 A1* | 8/2008 | Torbov et al. ............... 110/345 |

FOREIGN PATENT DOCUMENTS

| | | |
|---|---|---|
| DE | 38 16 600 A1 | 11/1989 |
| DE | 43 00 933 C1 | 5/1994 |
| DE | 195 33 912 A1 | 3/1997 |
| DE | 196 28 212 A1 | 1/1998 |
| DE | 198 29 916 A1 | 1/2000 |
| DE | 102 18 380 A1 | 11/2003 |
| DE | 102 22 915 A1 | 1/2004 |
| DE | 102 41 004 A1 | 3/2004 |
| DE | 102 42 081 A1 | 3/2004 |
| DE | 103 25 779 A1 | 1/2005 |
| EP | 0 335 240 A2 | 3/1989 |
| EP | 0 353 467 A1 | 2/1990 |
| EP | 0 677 320 | 10/1995 |
| EP | 0 763 589 B1 | 3/1997 |
| EP | 0 824 973 A2 | 2/1998 |
| EP | 0 910 472 B1 | 4/1999 |
| EP | 19990936166 | 7/1999 |
| JP | 58 30345 | 2/1983 |
| WO | WO 95/20434 | 8/1995 |
| WO | WO 96/15845 | 5/1996 |
| WO | WO 98/02248 | 1/1998 |
| WO | WO 00/01483 | 1/2000 |
| WO | WO 00/12211 | 3/2000 |
| WO | WO 03/099437 A1 | 12/2003 |
| WO | WO 2004/022226 A1 | 3/2004 |
| WO | WO 2004/026447 A1 | 4/2004 |
| WO | WO 2004/073835 A1 | 9/2004 |
| WO | WO 2004/076067 A1 | 9/2004 |

* cited by examiner

METHOD FOR REMOVING MERCURY FROM FLUE GAS AFTER COMBUSTION

CROSS-REFERENCES TO RELATED APPLICATIONS

This application claims the benefit of European Patent Application No. 07115662, filed Sep. 4, 2007, herein incorporated by reference.

FIELD OF THE INVENTION

The present invention relates to a method of removing mercury from flue gas.

BACKGROUND OF THE INVENTION

Flue gases from combustion installations, such as power plants or waste incineration plants, contain a number of pollutants, which must be removed from the flue gas before they are released to the environment. Modern combustion installations are equipped with flue gas cleaning devices, which remove sulfur dioxide, nitrogen oxides, hydrogen halides and entrained ash contained in the flue gas.

In addition to the pollutants referred to above, the flue gas contains traces of heavy metals, which must be removed from the flue gases due to their toxicity. One particularly poisonous heavy metal contained in the flue gas is mercury. This is washed out of the flue gas in conventional wet flue gas desulfurization (FGD) plants and flows with the waste water from the FGD into the FGD waste water treatment (WWT) plant. The mercury dissolved in the FGD waste water is precipitated in the WWT in a low-solubility form together with other solid materials in the form of FGD-WWT sludge. As a result of the contamination with mercury, this FGD-WWT sludge can, however, not be burned but must be disposed of as hazardous waste.

European application EP 0 792 186 B1 discloses a cleaning method of flue gases, with which mercury can be removed from the flue gases. For this purpose, the flue gases are subjected to a wet scrubbing process, wherein this wet scrubbing process is conducted with the addition of activated carbon particles, which adsorb the heavy metals and, in particular, mercury. The activated carbon particles are then separated from the suspension produced in the wet scrubbing process and recirculated into the wet scrubbing process, whereby a fraction of the particles is tapped off and thermally desorbed. The thermal desorption is complex in regards of process technology and is thus expensive.

SUMMARY OF THE INVENTION

It is therefore the objective of the invention to provide a simple and economical method of removing mercury from the flue gases.

The objective is solved by a method in which mercury contained in the flue gases is first brought into contact with an absorption reagent (e.g. scrubbing solution) containing an adsorption reagent (e.g. activated carbon), whereby the mercury is substantially removed from the absorption reagent by adsorption onto the adsorption reagent after the mercury has been absorbed from the flue gas by the absorption reagent. In the context of this application, the use of the term "mercury" includes mercury in the 0, 1 and 2 oxidation levels.

Further advantageous embodiments, features and advantages of the invention are described more fully hereinafter.

BRIEF DESCRIPTION OF THE DRAWINGS

For a more complete understanding of this invention reference should now be had to the preferred embodiments illustrated in greater detail in the accompanying drawings and described below. In the drawings, which are not necessarily to scale.

DETAILED DESCRIPTION OF THE INVENTION

Figure 1:
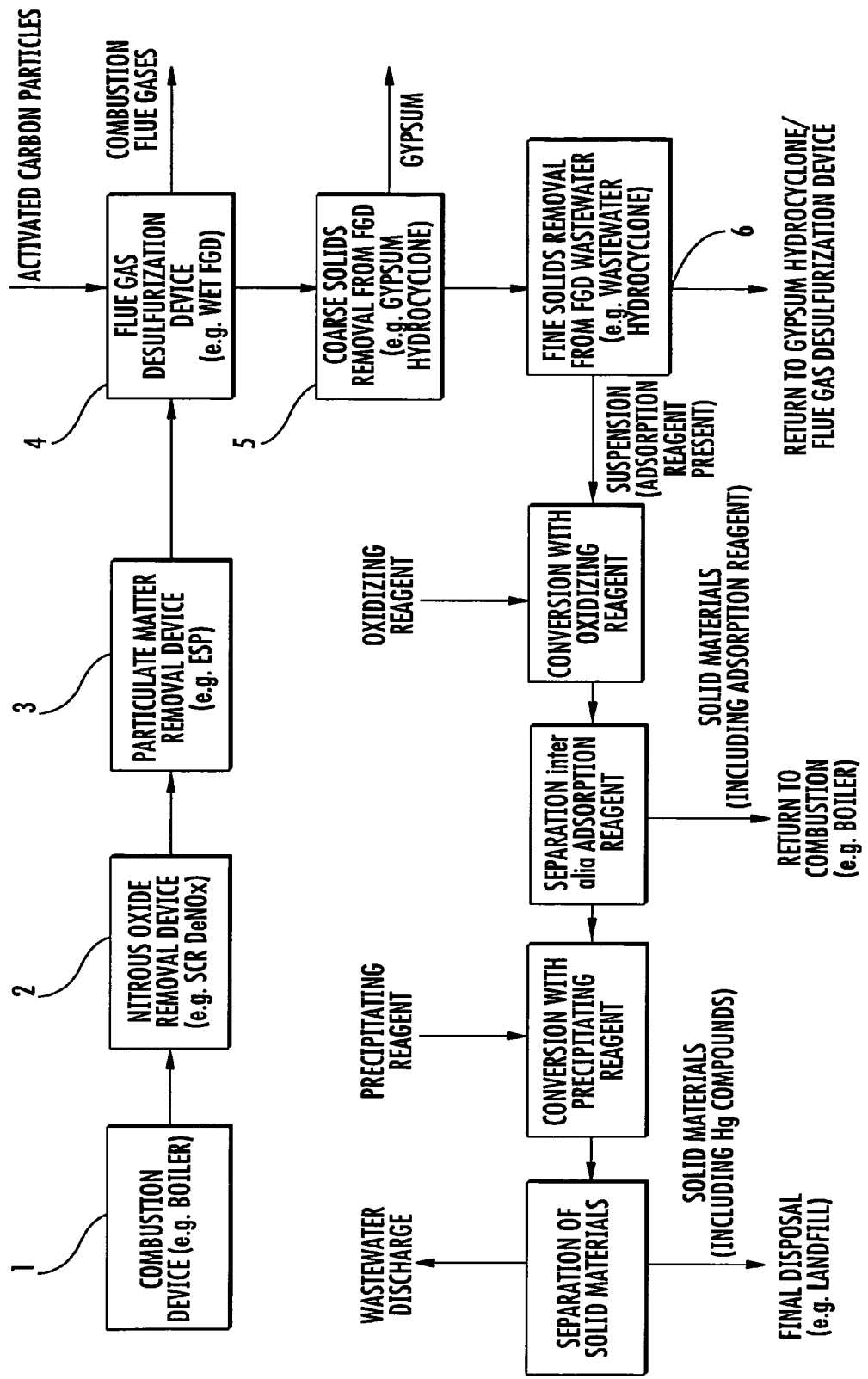
FIG. 1 is a flow diagram of an exemplary implementation of the method in accordance with the present invention referring to the flue gas cleaning of a 500 MW unit in a bituminous coal-fired power plant.

In the method in accordance with the invention, the adsorption reagent can, for instance, be blown into the flue gas in the form of fine particles. In this case, the mercury is adsorbed substantially directly by the adsorption agent from the flue gases. The adsorption agent can also be added to a wet scrubbing process, such as wet FGD. In this case, the mercury contained in the flue gases will be first partially dissolved and is substantially adsorbed from the liquid phase by the adsorption reagent. It is also possible to combine the adsorption from the gas phase and from liquid phase by introducing the adsorption reagent into the combustion flue gas upstream of a wet scrubbing process.

Common adsorption reagents, such as bentonite, silica gel and activated carbon, can be used as the adsorption reagent.

The adsorption reagent is separated from the scrubbing solution after the adsorption of mercury. Such separation can be conducted with all the devices known to experts (e.g. hydrocyclones).

The adsorption reagent loaded with mercury has been separated from the liquid phase (scrubbing solution); it is now brought into contact with an aqueous solution containing an oxidizing reagent.

Investigations showed surprisingly that with such a treatment of the adsorption reagent, the adsorbed mercury can be almost quantitatively separated (desorbed) from it and transferred back into the aqueous solution in the form of $Hg^{2+}$. Heating of the aqueous solution is not necessary, whereby this process step can be implemented very economically.

The present method is not limited to a specific oxidizing reagent. For instance, hypochlorite, chlorine dioxide or chlorine gas can be used. It is also possible to desorb the mercury from the adsorption reagent by catalytic oxidation with air, optionally in the presence of a $Cu^{2+}$ salt. The use of hypochlorite is particularly preferred since it is easy to handle, and is economically available in large quantities compared to gaseous oxidizing agents. It has further been determined that, if using hypochlorite, only a short residence time of the adsorption reagent in the aqueous solution is necessary in order to desorb the mercury from the adsorption reagent.

Since certain oxidizing reagents operate only in specific pH ranges, a pH range can be determined, which is the most favorable for subsequent process stages, by appropriate selection of the oxidizing reagent in this step of the method.

After the mercury has been desorbed from the adsorption reagent, the $Hg^{2+}$-containing solution is separated from the adsorption reagent and other solid materials which might be present in the solution. The concentration of mercury and other potentially present solid materials within the adsorption reagent is now so low that this reagent can, for instance, be burned.

After this separation stage, the mercury is removed from the solution. The removal of the mercury from the solution can be performed with any method known to the expert.

The method in accordance with the invention has a number of advantages by comparison with other known methods. On one hand, the waste water extracted from the treatment process of the flue gases, for instance from an FGD scrubber, is contaminated with mercury to a very small extent only because, as a result of the addition of the adsorption reagent, the mercury is transferred to the adsorption reagent. With the result, that the FGD-WWT sludge separated in a subsequent waste water treatment system is not contaminated with mercury and therefore the necessity of disposal as hazardous waste does not occur and the FGD-WWT sludge can be burned instead. Furthermore, the mercury can be separated again from the adsorption reagent with a solution including an oxidizing reagent in a manner, which is simple in regards of process technology and after this economical separation mercury can be removed from the solution with a known method.

The dissolved $Hg^{2+}$ can be removed from the solution in a manner, which is particularly economical and not complex in regards of process technology, by adding to the $Hg^{2+}$-containing solution a precipitating reagent, which forms a low solubility precipitate with $Hg^{2+}$ and separating it from the solution. Sulfides, and particularly organosulfides, are preferred precipitating agents. The mercuric sulfide, which is formed in the reaction with the precipitating reagent, is stable over a wide pH range and can be further processed as a pigment in various industries. It is also advantageous that mercuric sulfide is practically insoluble in water and is thus classified as non-toxic. The use of organosulfides is particularly preferred as they form with the mercury "larger" organomercuric sulfide molecules, which precipitate more easily out of the corresponding solution in comparison to pure mercuric sulfide. The lower the mercury concentration is within the flue gases, the more the use of organosulfides is recommended in order to enable the lowest possible mercury concentration in the treated waste water.

Alternatively, the $Hg^{2+}$ can be removed from the solution by getting the solution into contact with an ion exchanger. This kind of removing mercury from the solution is also easy to implement in regards of process technology.

Various IMAC™ alternatives or 1,3,5-triazine-2,4,6-trithiol can be used as the ion exchange resin. The method in accordance with the invention is, however, not limited to these resins. Ion exchanger resins with functional H—S groups are specifically preferred since these resins are particularly efficient in mercury removal from the solution.

In a preferred enhancement of the invention, $Hg^0$ contained in the flue gases is oxidized before bringing the mercury contained in the flue gas into contact with the adsorption reagent. Since the adsorption reagents preferably adsorb $Hg^{2+}$, the Hg concentration in the cleaned flue gases can be further reduced by increased oxidation of $Hg^0$ prior to adsorption. Such oxidation is, however, only necessary and sensible if the $Hg^0$ concentration in the flue gases is too high. The oxidation of the $Hg^0$ can, for instance, be influenced by catalysts or halogens, but any other process known to the expert for oxidizing the $Hg^0$ is suitable.

When cleaning the flue gases, the flue gases are, amongst other things, desulfurized. This desulfurization takes place in so called FGD scrubbers, where the sulfur dioxide contained in the flue gases is absorbed and reacts to sulfite and sulfate in the presence of an oxidizing reagent. The sulfite or sulfate is separated and—depending on the desulfurization process— further processed or disposed of. This separation step can also be used for separating the adsorption reagent from other solid materials by supplying the adsorption reagent to the flue gases before and/or in the FGD scrubber. The separation of the sulfite or sulfate can be combined in this manner with the separation of the adsorption reagent, which reduces the additional complexity in regard of installations and thus the cost. This separation may be implemented particularly simply if the solid materials produced in the FGD scrubber are separated from the adsorption reagent by centrifugal forces. Two phases are produced with such separation. One phase contains the heavy crystalline (e.g. calcium) sulfite or sulfate (herein referred to as gypsum) and the other is a FGD waste water suspension, which contains, amongst other components, the adsorption reagent and further solid materials, in particular metal hydroxides. After the gypsum has been separated, the adsorption reagent is separated, together with the other solid materials, from the FGD waste water.

Since activated carbon has a particularly large active surface area and thus needs to be added to the combustion flue gases only in very small quantities, activated carbon is preferably used as the adsorption reagent. The use of activated carbon has further the advantage that it can be simply separated in the subsequent process step. Furthermore, after getting into contact with a solution containing an oxidizing reagent, the activated carbon can be burned without difficulty with other solid materials to be removed, as mentioned previously.

The use of activated carbon produced from peat offers particular advantages due to the larger internal surface area compared to other types of activated carbon.

In combustion installations, in which large volumes of flue gases are produced, for instance in power stations, it is advantageous that the adsorption reagent is separated and recirculated after contact with a solution containing an oxidizing reagent. The procurement costs for the adsorption reagent may be reduced in this manner and the environmental impact produced by burning the adsorption reagent is prevented.

The invention will be explained in more detail below by way of a preferred exemplary implementation of the method in accordance with the invention, in conjunction with the attached drawing FIG. 1. The drawing FIG. 1 is a flow diagram of an exemplary implementation of the method in accordance with the invention.

The exemplary implementation of the method in accordance with the invention shown in the flow diagram refers to the flue gas cleaning of a 500 MW bituminous coal-fired unit in a power plant.

The flue gas flows from the boiler (1) to the nitrous oxide removal device (2), where nitrogen oxides are removed from the flue gases. The nitrous oxide removal device can be operated in accordance with a method known to experts, such as selective non-catalytic or selective catalytic nitrous oxide removal.

The processed flue gases flow into a particulate matter removal device such as e.g. an electrostatic precipitator or fabric filter (3), in which suspended particulate matter is separated from the flue gases. For the purpose of particulate matter removal from the flue gases, an electrostatic precipitator (ESP) or a fabric filter is generally used in power stations.

The precise method used for the nitrous oxide and particulate matter removal has, however, no influence on the present invention—these two working steps are merely shown for the sake of completeness.

Leaving the ESP the flue gas flows into the flue gas desulfurization plant or FGD scrubber (4). In the illustrated exemplary implementation of the method in accordance with the invention, the sulfur dioxide in the combustion flue gases is removed with a spray absorption method, in which a basic slaked lime suspension is sprayed into the combustion flue gases to be cleaned. The $CaSO_3$ produced in the reaction with sulfur dioxide is oxidized, for instance with atmospheric oxygen, to form $CaSO_4$ (gypsum). In this oxidation process, $Hg^{1+}$, which is potentially still present in the flue gases, is oxidized to $Hg^{2+}$.

The invention is not limited to lime as an adsorbent for the desulfurization, slaked lime is shown here only as an example. In alternative exemplary implementations, other desulfurization methods can be utilized—for instance desulfurization with ammonia or limestone.

Activated carbon particles constituting an adsorption reagent are added to the so called recycle tank of the FGD scrubber (4). The activated carbon particles adsorb the $Hg^{2+}$, which has passed over from the combustion flue gases into the FGD scrubber solution. In alternative exemplary implementations, it is, for instance, possible to inject fine activated carbon particles into the flue gases upstream of the FGD scrubber. In such an event, a proportion of the mercury present in the combustion flue gases is already adsorbed by the activated carbon particles from the combustion flue gases themselves. The mercury which is not already adsorbed is dissolved in the FGD scrubber solution and here adsorbed by the activated carbon particles.

In a 500 MW bituminous coal-fired unit, about 1.5 million $Nm^3$ flue gases are produced per hour. With a mercury content of <0.50 mg per kilo carbon, only about 4 kg of activated carbon need to be injected per hour. The concentration of the activated carbon particles in the FGD scrubber solution with such an injection rate is about 100 mg/l. The suspension produced in the FGD scrubber, containing gypsum, further solid materials and activated carbon particles, is fed to a gypsum or primary hydrocyclone (5), where the suspension produced in the FGD scrubber is divided into two phases, namely suspension with the heavy crystalline $CaSO_4$ and a suspension, which contains the light activated carbon particles and further amorphous and thus light solid materials, such as fly ash and metal hydroxides. The degree of whiteness of the gypsum is only insignificantly reduced by the addition of activated carbon, namely from about 74% to 72%.

The suspension leaving the gypsum or primary hydrocyclone (5) at the overflow is fed to a waste water or secondary hydrocyclone (6). A fraction of the FGD waste water is separated from the suspension in this waste water or secondary hydrocyclone (6) resulting in a suspension with a higher solid material content. The volume of this suspension from the waste water or secondary hydrocyclone (6) is substantially reduced by comparison with the suspension from the gypsum or primary hydrocyclone (5) so that subsequent process steps can be of less expensive design as regards installation technology.

The FGD waste water leaving the waste water or secondary hydrocyclone (6) has a mercury concentration of only about 10 µg/l. The FGD waste water is in part recirculated into the scrubbing process and in part is supplied to a FGD waste water treatment plant. As a result of the low mercury content the FGD-WWT sludge produced in the first stage of the FGD waste water treatment plant can be burned—disposal is no longer necessary.

The method described in this exemplary implementation in accordance with the invention is, however, not limited to the separation of the activated carbon and other solid materials from the FGD waste water or the flue gases. Beside the usage of gypsum or primary hydrocyclones and waste water or secondary hydrocyclones, the separation can also be achieved with other separation methods known to an expert. The above separation method is, however, preferred since it enables separation into gypsum, FGD waste water and a suspension containing solid materials with simple means.

In a subsequent process step, an aqueous sodium hypochlorite solution with a pH value of ca. 6.5 is injected into the suspension from the waste water or secondary hydrocyclone (6), which contains the activated carbon particles and further solid materials. 1-4 ml of a ca. 13% sodium hypochlorite solution is introduced per liter of suspension. In order to prevent deposition of the solid materials at this time, the solution is mixed with a suitable stirring device. In alternative exemplary implementations, other oxidizing reagents in a different pH range can of course be used. During the treatment with the oxidizing reagent, the mercury is desorbed from the activated carbon and dissolved into the solution as $Hg^{2+}$.

When the mercury is dissolved entirely into the solution, depending on the used activated carbon, the concentration of the oxidizing reagent and on the temperature, the solution is mixed with a flocculating aid and/or a flocculating agent and, in order to increase the pH value of the solution, with $Ca(OH)_2$. The pH value of the solution is thus adjusted to a pH value of about 8.5. The increase in the pH value is done on one hand to fulfill legal requirements, which state that FGD waste water from a FGD waste water treatment plant must have a pH value within a specific pH value margin, and, on the other hand, to ensure gypsum desaturation of the solution, which means that by adding $Ca(OH)_2$, more calcium sulfate is precipitated from the solution. Furthermore, when the pH value is increased, more metal hydroxides, such as nickel and copper hydroxide, precipitate out of the solution. The term flocculating reagent is to be understood as to those substances, which influence the particles in a suspension in such a way that they aggregate into flakes (microflakes) and can thus be removed from the suspension. Ferric(III)chloride, ferric(III)sulfate or any mixture of these salts is preferably used as flocculating reagent in the present exemplary implementation. The usage of these salts depends on their current availability. When these salts are added, a voluminous $Fe(OH)_3$ precipitate is produced, which agglomerates with other less voluminous solid materials. In order to accelerate the sedimentation velocity of the aggregated particles and to simplify separation of them, a so called flocculant or flocculating aid can be added, enhancing the agglomeration of solid material particles into larger units (macroflakes), which can settle more rapidly due to their higher mass and therefore be separated more easily. Anionic polymers are preferably added as the flocculants in the presented exemplary implementation. Whether and which amount a flocculant or a flocculating aid is added, depends on the composition of the suspension and the composition of the flue gas and thus on the chosen process technology.

The solid materials obtained in the suspension in the above treatment, which are now substantially free of mercury, are subsequently separated from the mercury-containing solution in a filter press or other solid/liquid separator. In the described exemplary implementation, about 20 tons of solid materials are produced per day, in which the mercury content is less than 10 g/t. As a result of this low mercury content, the solid materials can be burned again in the boiler and no costs thus arise for disposal. In another exemplary implementation, the solid materials can also be separated by sedimentation or flotation.

In order to precipitate the mercury, the mercury-containing solution is mixed in another step with organosulfide, a flocculating agent and a flocculating aid. Ferric(III)chloride is preferably used as the flocculating agent since this is economically available. An oxidation-resistant organosulfide is preferred as the organosulfide because the solution can achieve a high oxidation potential. In order to prevent sedimentation of the organo-mercuric sulfide at this time, the solution is mixed at this stage with a suitable stirring device. After the mercury has been precipitated in the form of a organo-mercuric sulfide, the solid materials are separated by means of a membrane filter press and disposed of. In the described exemplary implementation, about 0.2 tons organo-mercuric sulfide containing waste are produced per day.

The invention claimed is:

1. A method of removing mercury from a flue gas comprising:
   a) bringing mercury present in the flue gas into contact with an absorption reagent comprising an adsorption reagent, whereby the mercury is substantially adsorbed onto the adsorption reagent,
   b) separating the adsorption reagent comprising the adsorbed mercury from the absorption reagent,
   c) bringing the adsorption reagent into contact with an oxidizing reagent, whereby the adsorbed mercury is desorbed and dissolves in the form of $Hg^{2+}$ in a solution,
   d) separating the solution with $Hg^{2+}$-enriched from the adsorption reagent, and
   e) removing the $Hg^{2+}$ from the solution.

2. The method as claimed in claim 1, wherein the $Hg^{2+}$ is removed from the solution by mixing the solution with $Hg^{2+}$-present with a precipitating reagent, which forms with the $Hg^{2+}$ a low solubility precipitate and separating the latter from the solution.

3. The method as claimed in claim 2, wherein an organo-sulfide is used as the precipitating reagent.

4. The method as claimed in claim 1, wherein the $Hg^{2+}$ is removed from the solution by bringing the solution into contact with an ion exchanger.

5. The method as claimed in claim 1, wherein the $Hg^0$ present in the flue gases is oxidized before bringing mercury present in the flue gases into contact with the absorption reagent comprising adsorption reagent.

6. The method as claimed in claim 1, wherein the adsorption reagent is added to the flue gas before or in a flue gas desulfurization plant.

7. The method as claimed in claim 6, wherein bringing mercury present in the flue gas into contact with an adsorption agent takes place in the liquid phase used in the flue gas desulfurization plant, to which the adsorption reagent is added.

8. The method as claimed in claim 6, wherein solid materials produced in the flue gas desulfurization plant are separated from the adsorption agent by centrifugal separation.

9. The method as claimed in claim 1, wherein hypochlorite, chlorine dioxide or chlorine gas or any other strong oxidizing reagent is used as the oxidizing reagent.

10. The method as claimed in claim 1, wherein activated carbon is used as the adsorption reagent.

11. The method as claimed in claim 1, wherein after bringing the adsorption reagent into contact with a solution containing an oxidizing reagent, the adsorption reagent is separated and recirculated.

* * * * *